APPARATUS FOR PROVIDING FLUID BEARINGS

Filed June 30, 1960 3 Sheets-Sheet 1

INVENTOR.
RICHARD D. SCOTT
BY Morris [illegible]
ATTORNEY

Jan. 4, 1966 R. D. SCOTT 3,228,014

APPARATUS FOR PROVIDING FLUID BEARINGS

Filed June 30, 1960 3 Sheets-Sheet 2

INVENTOR.
RICHARD D. SCOTT
BY Morris A. Rabkin
ATTORNEY

INVENTOR.
RICHARD D. SCOTT
BY Morris [signature]
ATTORNEY 3,228,014

APPARATUS FOR PROVIDING FLUID BEARINGS

Richard D. Scott, Pennsauken, N.J., assignor to Radio Corporation of America, a corporation of Delaware Filed June 30, 1960, Ser. No. 39,913
6 Claims. (Cl. 340—174.1)

The present invention relates to apparatus for providing fluid bearings, and more particularly to apparatus operative to provide hydrodynamic fluid bearings. A hydrodynamic fluid bearing is defined as a device using a fluid lubricating film to maintain separation between two surfaces which move relative to each other without the benefit of externally pressurized sources of a fluid or of sinks into which a fluid is drawn. The fluid lubricating film is provided by a liquid or a gas. In a preferred form of the invention, air may be used.

The invention is especially useful in connection with transducing devices such as magnetic heads for magnetic recording and reproducing systems. In magnetic recording and reproducing systems, it is often necessary to maintain a very small spacing or separation between the record medium and the magnetic head. The record medium may for example, be a drum or disc which has a magnetizable recording surface. It is desirable to separate the head and the recording surface in order to eliminate wear of either or both the head and the recording surface.

Separation of the head and the recording surface presents certain difficulties since the ability of a system including a magnetic head to record and reproduce signals on a record medium depends upon the degree of such separation. The amplitude of the signals recorded or reproduced, the resolution of recorded signals, and the noise introduced by the system all depend upon the separation of the magnetic head and the surface of the record medium. For example, smaller separation provides greater coupling between the record medium and the head. When the record medium and head are closer to each other, higher amplitude signals are transduced.

The resolution of the recording system, which is defined as the ability of the head to detect short wavelengths of a recorded signal, is also affected by the spacing between the head and the record medium. The resolution of a magnetic recording and reproducing system, when considered in terms of pulse signals, may be expressed as the ability of the system to handle and resolve pulse signals which are recorded close together. A magnetic record having pulse signals recorded close together is said to have close pulse packing. Close pulse packing is of great significance in electronic data processing apparatus. In such apparatus, each pulse usually represents a bit of information. The closer the pulse packing, the greater the amount of information which can be stored on a given area of the record medium, whether it is a magnetic drum, a magnetic disc, or a magnetic tape. It is, therefore, again desirable for the magnetic head to be as close as possible to record medium so as to realize magnetic recording and reproduction with as close pulse packing as possible.

Maintenance of close spacing between the head and the record medium, without variation of such spacing, also presents certain difficulties. Due to machining tolerances and other mechanical factors, such as inherent bearing runout, the separation of the magnetic head and the record medium tends to vary. The ability of a system to maintain constant separation in spite of spacing variations due to runout and the like is referred to as the stability of the system. Variation in the spacing between a magnetic head and its cooperating record medium due to instability effectively modulates the signal recorded or reproduced by the magnetic head. This modulation introduces a noise component into the signal which, like other noise, should be kept small with respect to the signal for proper system operation.

Another problem in apparatus employing a fluid bearing is the collection of dirt or other foreign material between the surfaces which establish the bearing. When an excess amount of dirt is collected, proper lubrication is precluded and often the bearing fails. In such cases, the surfaces defining the bearing may strike each other and be permanently damaged.

It is an object of the present invention to provide apparatus for providing a hydrodynamic fluid bearing which has a minimum thickness smaller than prior bearings of this type and which is more stable than is the case with prior bearings of this type.

It is another object of the present invention to provide an improved transducing system utilizing hydrodynamic fluid lubrication.

It is a further object of the invention to provide improved means for supporting a magnetic head separated from a record surface by a hydrodynamic fluid lubricating film.

It is a still further object of the present invention to provide a magnetic recording and reproducing system having a magnetic head cooperative with a record medium wherein the head and the record medium are separated by an improved hydrodynamic fluid bearing.

It is a still further object of the present invention to provide an improved magnetic recording and reproducing system for providing a hydrodynamic fluid bearing, which system has greater signal output, higher signal resolution, and lower noise than prior system of the type employing hydrodynamic fluid bearings.

It is a further object of the present invention to provide improved apparatus employing a hydrodynamic fluid bearing which affords improved floating stability.

It is a still further object of the invention to provide apparatus operative to provide a hydrodynamic fluid bearing between two surfaces whereby portions of the surfaces can be maintained closer together than in prior apparatus of this type.

It is also an object of the present invention to provide an improved magnetic recording system in which a magnetic head and record medium are spaced from each other by a hydrodynamic fluid lubricating film and which provides greater signal resolution than was the case with prior systems of this type.

It is a still further object of the present invention to provide apparatus operative to provide a hydrodynamic fluid bearing in which accumulation of dirt and other foreign particles and damage resulting from such accumulation are minimized.

In accordance with the invention, a system is provided having two operating members, such as a magnetic record and a magnetic head assembly. The members each have a surface facing a cooperating surface of the other member. The surface of one of the members has an opening which provides fluid communication between the ambient and a portion of the space between the cooperating surfaces. This portion is desirably disposed near one edge of one of the surfaces. The members are suspended in a manner such that a wedge-shaped, hydrodynamic fluid bearing is formed between the cooperating surfaces, when the members move relative to each other at sufficiently high speeds. The fluid medium can flow through the opening in the surface of one of the members to the ambient so that one edge of one of the surfaces is actually outward behind the effective edge of the hydrodynamic fluid bearing. Since the bearing is wedge-shaped, this one edge of the surfaces is in closer proximity to the other of the cooperating surfaces than the thickness of the bearing.

A magnetic head assembly can, thus, be separated from a magnetic record by a hydrodynamic fluid bearing and the signal gap of the magnetic heads in the assembly can be disposed in the edge of the surface of the assembly which faces the record. The signal gap is actually closer to the surface of the record than the thickness of the bearing without, however, contacting the record.

The position of that one edge of one of the surfaces which is closest to its cooperating surface is also more stable than the effective edge of the hydrodynamic fluid bearing, since it can be shown that, when the cooperating surfaces move toward and away from each other, they do so about a pivotal axis which is closer to that one closest edge than to the effective edge of the hydrodynamic bearing.

The invention also provides an improved suspension for a magnetic head assembly. The suspension includes a spring which is readily adjustable to accurately position the head assembly adjacent the magnetic record.

The invention itself, both as to its organization and method of operation, as well as additional objects and advantages thereof, will be understood more readily from the following description, when read in connection with the accompanying drawings in which.

Figures 1, 5, 6, 7:
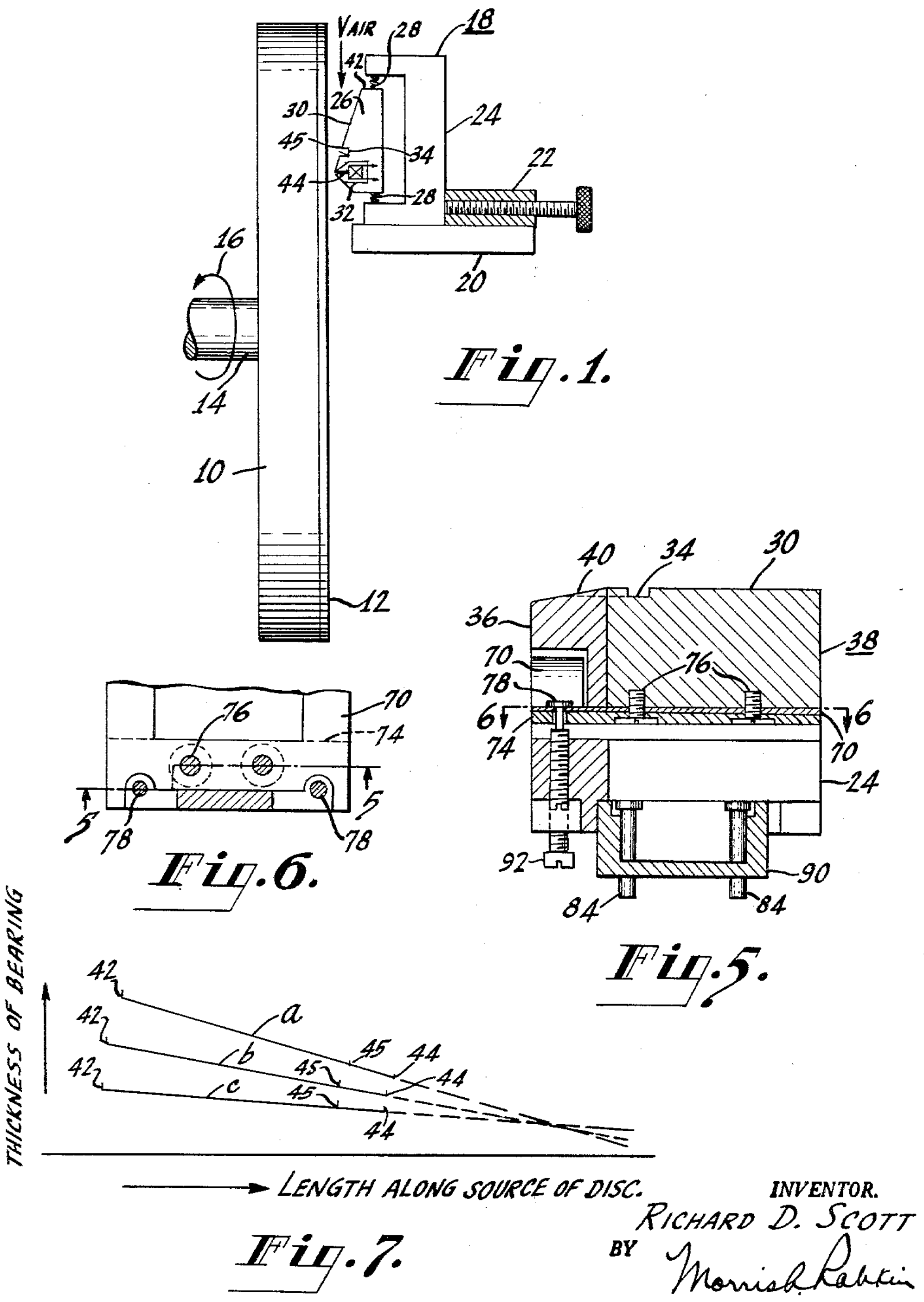
FIG. 1 is a side elevation of a magnetic recording and reproducing system provided with a magnetic head assembly and mounting in accordance with the present invention.
FIG. 5 is a sectional view taken along the line 5—5 in FIG. 6 certain parts being disposed in somewhat different positions than shown in FIGS. 1, 2 and 3.
FIG. 6 is a fragmentary sectional view taken along the line 6—6 in FIG. 5 but drawn to a different scale than FIG. 5.
FIG. 7 is a graph illustrating characteristics of a system including the illustrated magnetic head assembly.

The invention is illustrated as applied to a magnetic recording and reproducing system. FIG. 1 of the drawings shows a magnetic disc record member 10 having a recording surface 12. This recording surface 12 may be coated with a magnetizable material, such as a magnetic iron oxide, which may be sprayed on the disc 10 to define the recording surface. The disc 10 is driven by a shaft 14. The shaft 14 may be coupled to an air turbine drive system so that the record is driven at constant speed. The direction of motion of the record is counterclockwise when viewed from the left, as indicated by the arrow 16 in FIG. 1.

A magnetic head assembly 18 is mounted adjacent the disc 10 on a track 20. The assembly 18 is spaced from the center of the disc 12 and can be mounted at the far or near side of the disc as viewed in the drawing. The assembly may be moved toward or away from the disc by means of a micrometer screw mechanism 22. The track 20 and micrometer screw mechanism 22 are merely illustrative of any suitable means for mounting the head assembly for reciprocal movement toward or away from the recording surface 12 of the disc 10.

The head assembly 18 includes a base 24 and a body 26 which contains a plurality of magnetic heads 32. The body 26 is yieldably mounted on the base 24 by means of springs 28.

The body 26 has a surface 30 which faces the recording surface 12. Both surfaces 12 and 30 are planar surfaces. The surfaces may, however, be of other shape. For example, the record member may be a magnetic drum rather than a magnetic disc such as illustrated in FIG. 1. The recording surface 12 would then be cylindrical in shape. In that case, the surface 30 of the body 26 would also be curved to correspond to the shape of the recording surface 12.

When the disc 10 revolves at high speed (for example, 4,000 inches per second), a hydrodynamic bearing is established between the recording surface 12 and the surface 30 of the body 26. In the illustrated case, the magnetic disc 10 and the head assembly 18 are immersed in the ambient medium, which is air. The bearing is provided by the movement of the air designated by the legend, $V_{air}$. The direction of movement of the air is shown by the arrow. Thus, when the disc revolves, the body 26 is dynamically floated on a film of air. This film of air is wedge-shaped and is thicker adjacent to the leading edge 42 of the surface 30 than adjacent to the trailing edge 44 of the surface 30. The formation of a hydrodynamic air bearing is described in detail in an article by W. A. Gross entitled "A Gas Film Lubrication Study—Part I Some Theoretical Analyses of Slider Bearings," published in the IBM Journal of Research, vol. III, No. 3, July 1959, pages 237–255, inclusive.

Figure 2:
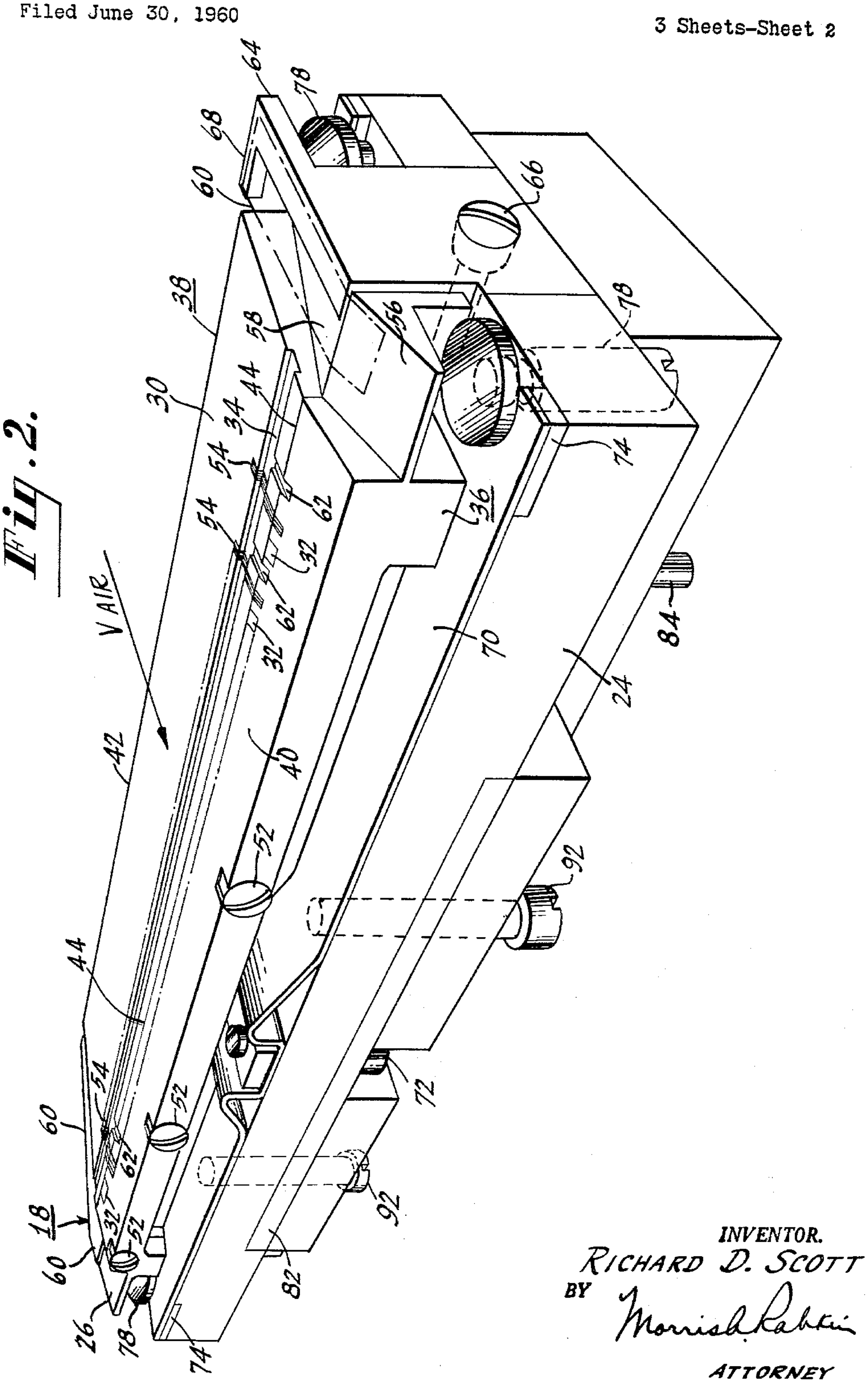
FIG. 2 is a perspective view of a magnetic head assembly constructed in accordance with the present invention.
Figure 3:
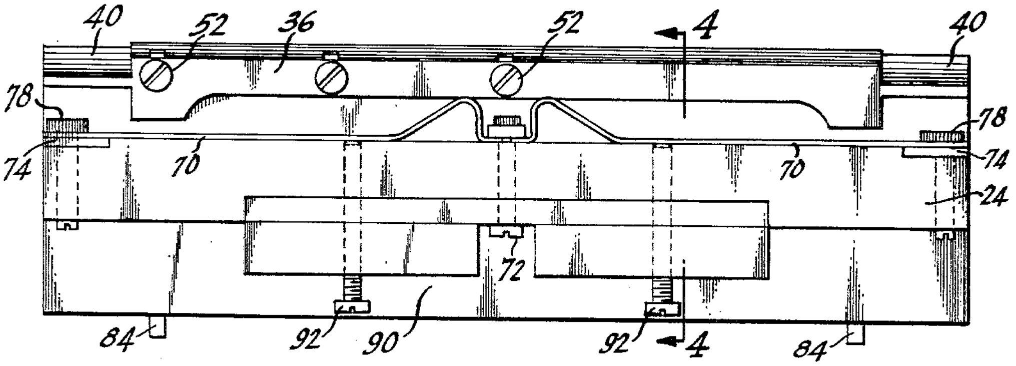
FIG. 3 is a front elevation, on a reduced scale, of the magnetic head assembly shown in FIG. 2.

The surface 30 of the body 26 is specially configured. It is formed with a groove 34 generally paralleling the trailing edge 44 of the surface 30. This groove 34 communicates with the ambient air at its ends and through a plurality of notches 62 which extend through the body perpendicularly to the groove 34. These notches 62 are illustrated in FIG. 2. A plurality of magnetic heads 32 is disposed in the body 26. The heads each have a signal gap. The signal gaps are all disposed along the trailing edge of the surface 30 and are coincident with the trailing edge 44. The grooved and notched surface 30 provides for a hydrodynamic air bearing having greater stability at the trailing edge of the surface than is the case with conventional hydrodynamic fluid bearings provided by continuous surfaces. The bearing permits closer proximity of the recording surface 12 to the surface 30 at the trailing edge of the surface 30. The signal gaps of the head 32 are therefore held quite close to the recording surface 12 and are stable in their position. These features will be discussed hereinafter in connection with a consideration of the operation of the recording and reproducing system illustrated in the drawings.

Reference is now made of FIGS. 2 to 6 wherein the magnetic head assembly 18 is illustrated in detail. The principal parts of the magnetic head assembly are the body 26 and the base 24. The body 26 is provided with two longitudinally extending clamping block members 36 and 38 of nonmagnetic material. The upper surface of the clamping block member 38 provides the surface 30 of the body. The upper surface 40 of the other clamping block member 36 is sharply tapered with respect to the surface 30 and does not take part in the formation of the hydrodynamic air bearing. The upper surface 30 of the clamping block member is bounded by its leading edge 42 and its trailing edge 44.

The clamping block members 36 and 38 also have beveled end portions 56 and 58 which are recessed below the surfaces 30 and 40 of the members 36 and 38.

Figure 4:
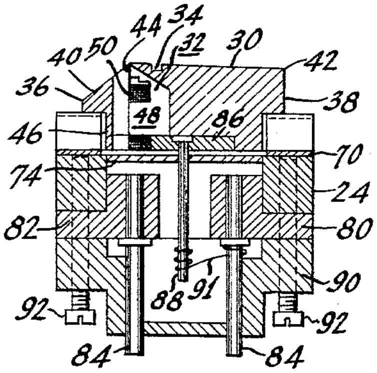
FIG. 4 is a cross-sectional view taken along the line 4—4 of FIG. 3.

The magnetic heads 32 are disposed in openings in the clamping block members 36 and 38. As illustrated in FIG. 4, the heads 32 each have a lineal core leg 46 and a U-shaped core part 48. The core legs 46 are disposed in openings in the clamping block member 36. The U-shaped core parts 48 of the magnetic heads are disposed in openings in the clamping block member 38. Coils 50 of the magnetic heads are disposed within the openings in the U-shaped core parts 48. The clamping block members 36 and 38 are assembled together and securely fastened to each other by means of screws 52. The signal gaps and back gaps of the heads 32 are defined by the assembled core legs 46 and core parts 48. It will be observed that the signal gaps of the magnetic heads all lie along the trailing edge 44 of the surface 30 of the clamping block member 38.

The groove 34, which is formed in the surface 30 of the clamping block member 38, generally parallels the trailing edge 44. The depth of the groove 34 into the member 38 should be approximately a few mils. The depth of the groove and its size is exaggerated here solely for the purpose of illustration.

A plurality of notches 62 are formed in the clamping block members 36 and 38. These notches extend generally perpendicularly to the groove 34 through the clamping block members 38 and 36. It will be observed that these notches 32 extend through the trailing edge of the surface 30 and afford communication between the groove 34 and the ambient air. The notches 62 are disposed on opposite sides of each of the magnetic heads 32. One or more notches may be disposed between each pair of adjacent heads 32.

Openings, as illustrated, may be provided in each of the clamping block members 36 and 38 for shields 54. These shields 54 are disposed between each magnetic head 32 and prevent linkage of leakage flux such as may produce cross talk in a multichannel magnetic recording and reproducing system.

The base 24 is essentially rectangular in shape and has a rectangular opening in the center thereof. The base 24 has cut off portions in the ends thereof. Arms 64 are disposed in these portions and are fastened to the base 24 by means of bolts 66. These arms 64 have L-shaped extensions 68. Straps 60 are secured, as by being cemented, to these L-shaped extensions 68 and to the beveled end portions 56 of the clamping block members 36. The one of these straps 60 at the right hand side of FIG. 2 is shown in phantom by lines constituted of short and long dashes. The straps 60 prevent the movement of the clamping block members 36 and 38 in the direction of the air indicated by the arrow in FIG. 1.

A flat leaf spring 70 for biasing the clamping block members 36 and 38 upwardly is provided. The spring 70 is open internally and is fastened to the base 24 by means of nuts and bolts 72. The curvature of the spring 70 adjacent the screws 72 provides for the elongation of the spring 70 as it is moved upwardly by the screws 92. The spring 70 is fastened to the clamping block members 36 and 38 at its ends. Plates 74 of stiff material (see FIGS. 5 and 6) are disposed beneath the ends of the spring 70. Screws 76 extend through openings in each of the plates 74 and through openings in the spring 70 and attach the plates 74 and spring 70 to the bottom of the clamping block member 38. Four flat headed adjusting screws 78, three of which are shown in FIG. 1 of the drawings, are provided to limit the upward movement of the spring and the clamping block members 36 and 38 attached thereto. These screws 78 may be adjusted by alignment tools inserted from the bottom of the base 24.

Elongated terminal boards 80 and 82 (see FIG. 4) are secured to the bottom of the base 24. These terminal boards have pin terminals 84 extending therefrom. Another terminal board 86 is attached to the bottom of the clamping block member 38. Pin terminals 88 are attached to this terminal block 86. The pin terminals 88 are connected to the pin terminals 84 by means of flexible leads 91. These leads move with the clamping blocks 36 and 38 and accommodate for motion of the clamping blocks and magnetic heads with respect to the base 24. The coils 50 on the magnetic heads are connected to different ones of the pins 88. Two pins are provided for each coil 50. The magnetic head may be connected to electronic apparatus associated therewith by way of the terminal pins 84.

A cover 90, through which the pins 84 extend, is attached to the bottom of the base 24 and to terminal boards 80 and 82 by means of screws 92 and serves to protect the terminal pins 84 and 88 and leads 91 from damage.

The magnetic head assembly illustrated in FIGS. 2 to 6 of the drawings may be mounted generally in the manner illustrated in FIG. 1, adjacent the record 10. The cooperating surfaces 12 and 13 of the magnetic disc record 10 and head assembly 18 provide a hydrodynamic air bearing therebetween when the disc 10 rotates at high speed.

In operation, the magnetic head assembly 18 is first brought into contact with the recording surface 12. Then, using the micrometer screw 22, the magnetic head assembly is backed away from the recording surface a short distance, for example, twenty mils. Power is applied to drive the shaft 14 so that the disc 10 is rotated. When the disc reaches a predetermined speed of rotation, for example, 4,000 inches per second, further adjustments are made on the magnetic head in order to bring the head as close as possible to recording surface yet maintaining a minimum separation. This separation may be less than fifty micro-inches. In order to make these final adjustments, the screws 92 (see FIG. 2) are individually adjusted while the disc is rotating. The signal output from the heads is observed on an oscilloscope. The screws 78 control the retracted position of the head 32 since the tendency for the spring 70 to force the clamping blocks 36 and 38 toward the record 10 is restricted by the screws. When the requisite signal output appears on the oscilloscope, the adjustment is completed.

A feature of the magnetic head assembly provided by the invention is suspension of the blocks 36 and 38 which support the magnetic heads 32. The spring 70 urges the blocks toward the disc 10. The screws 78 hold back the spring. Since four screws 78 are provided, there are four points of adjustment. This permits the clamping blocks 36 and 38 to be tilted in almost any direction or moved upwardly away from the base 24 (as is shown in FIG. 5) or held down against the base (as is shown in FIG. 4).

When the disc is rotating and the requisite adjustments are made a microscopically thin film of air provides the hydrodynamic air bearing which separates the surface 30 from the recording surface 12 of the disc 10. The air of the film moves between the surfaces 12 and 30 in the direction indicated by the arrow labeled with the legend $V_{air}$. This film of air enters the groove 34 and passes below the surface 30 through the notches 62. The groove 34 and notches 62 essentially disturb and distort the flow of the film of air so that the air bearing is defined essentially between that portion of the surface 30 which lies between the leading edge 42 of the surface 30 and the groove 34. The effective rear boundary of the bearing is the leading edge 45 of the groove 34 rather than the trailing edge 44 of the surface 30. The magnetic heads 32 are disposed at the trailing edge 44 of the surface 30. In this position, at the trailing edge, the signal gaps of the magnetic heads are in closer proximity to the recording surface than the effective edge of the air bearing. This will be observed from the graph in FIG. 7 of the drawings. The graph illustrates the thickness of the air bearing across the surface of the disc. Three lines *a*, *b* and *c* constitute the graph of FIG. 7. These lines are in part solid and in part dashed. The solid parts of the lines correspond to the surface 30. The leading edge 42 and the trailing edge 44 are shown, respectively, towards the left and towards the right of each of the solid lines. The effective trailing edge 45 is also shown between the actual edges 42 and 45. These lines indicate the shape of the bearing in three illustrative positions or spacing variations which result as the surface 12 of the disc 10 moves with respect to the surface 30 of the head assembly due, for example, to bearing run-out in the magnetic disc. Of course, such spacing variations may be due to other factors such as temperature variations, machine tolerances, and the like.

The air bearing is always wedge shaped. The narrowest portion of the wedge is closest to the rear of the bearing. Thus, by positioning the signal gaps of the magnetic heads at a position outward beyond the effective rear edge 45 of the bearing, the signal gaps will be in closer proximity to the recording surface of the disc than would be the case if the signal gaps were at the effective rear edge of the bearing.

The position of the signal gaps of the magnetic head 32 is also more stable than would be the case if the surface of the magnetic head assembly were not provided in accordance with the invention. Since the signal gap of the magnetic head at the trailing edge 44 of the surface 30 is outward beyond the effective rear edge 45 of the bearing, the position of the signal gap varies less than the position of the effective rear edge 45. This increased stability may, in practice, provide a latitude for adjustment of approximately 50 microinches greater, in a typical case, than the latitude for adjustment which would be provided if the surface of the magnetic head assembly were formed without the groove 34 and the notches 62. It will be appreciated that an improvement in stability of position, although only a matter of microinches, is relatively great with respect to the total separation of the signal gap of the head from the recording surface 12 of the disc 10.

Since the groove 34 and notches 62 provide means for flowing of air away from the signal gaps of the magnetic head, this groove and these notches inherently reduce the accumulation of dirt and foreign particles at the signal gaps of the magnetic heads. Such foreign particles may be particles of dust which are commonly found in the ambient air. Thus, it is an important feature of the invention to prevent the accumulation of such foreign particles and improve the operation of the magnetic recording and reproducing system.

From the foregoing description, it will be apparent that there has been provided improved apparatus operative to provide hydrodynamic fluid bearings and which is especially suitable for use in magnetic recording and reproducing systems. While a magnetic recording and reproducing system has been shown incorporating features in accordance with one embodiment of the invention, various components and elements useful therein, as well as variations in the apparatus itself, all coming within the spirit of the invention will, no doubt, readily suggest themselves to those skilled in the art. Hence, it is desired that the foregoing shall be considered merely as illustrative and not in any limiting sense.

What is claimed is:

1. Apparatus for supporting a plurality of magnetic heads for cooperation with record tracks on the surface of a magnetic record which comprises a support member having a surface bounded by opposite, front and rear edges, said heads having signal gaps, said heads being mounted in spaced relation in said member with said gaps disposed at said rear edge, said member having a groove extending from its said surface and generally paralleling said rear edge, said member also having a plurality of notches therein each extending between adjacent ones of said heads from said groove through said rear edge, and means for mounting said member and said record with said member surface and said record surface facing each other in spaced relationship so that a hydrodynamic fluid bearing is established between said surfaces when said record and member move relative to each other.

2. In a transducing system having a transducing device cooperable with a record having a recording surface, the combination comprising a member having a surface cooperable with said recording surface, means for supporting said member for movement toward and away from said recording surface and with said member surface opposed to said recording surface, and means for moving said member with respect to said device to establish a film of air between said recording surface and said member surface, said film flowing in a direction from a first to a second edge of said member surface, said first and second edges being opposite edges of said member surfaces, said member surface having a groove therein spaced closer to said second edge than to said first edge, said member surface also having a plurality of notches therein extending from said groove to said second edge, and means for mounting said device at said second edge.

3. The invention as set forth in claim 2 including adjustable spring means for biasing said member towards said recording surface.

4. In a system cooperative with a magnetic record member having a recording surface, the combination comprising a magnetic head assembly including a plurality of magnetic heads each having a signal gap, said assembly having a surface cooperable with said recording surface means for supporting said assembly for movement toward and away from said recording surface and with said assembly surface opposed to said recording surface, and means for moving said record member with respect to said assembly to create a film of air between said recording surface and said assembly surface flowing in a direction from a first edge to a second edge of said assembly surface, said signal gaps being disposed along said second edge, said assembly surface having a groove therein spaced closer to said second edge than to said first edge, said assembly surface also having a plurality of notches therein between adjacent ones of said heads and extending from said groove to said second edge.

5. In a magnetic recording and reproducing system having a rotatable record member presenting a magnetizable recording surface, a magnetic head assembly comprising a body of non-magnetic material having a surface corresponding in shape to said recording surface, said body surface having a first edge and a second edge, said first and said second edges being opposite to each other, a plurality of magnetic heads disposed in said body, said magnetic heads having signal gaps disposed along said second edge, said body surface having a groove therein generally paralleling said second edge and spaced closely adjacent thereto, said body surface also having a plurality of notches therein, each between different adjacent ones of said heads, said notches extending from said groove to said second edge, a base, a leaf spring secured at the center of said spring to said base and to said body at opposite ends of said spring, said spring biasing said body away from said base, a plurality of screws in said base for controlling the position and tension of said spring, and means for mounting said base adjacent to said record member with said body surface opposed to said recording surface whereby a hydrodynamic fluid bearing is established between said surfaces when said record member rotates.

6. The invention as claimed in claim 5 including a plurality of screws in said base, each disposed in contact with a different part of said spring for separately controlling the position of said spring.

References Cited by the Examiner

UNITED STATES PATENTS

| | | | |
|---|---|---|---|
| 2,862,781 | 12/1958 | Baumeister. | |
| 2,873,683 | 2/1959 | Sherwood | 179—100.2 |
| 2,899,260 | 8/1959 | Farrand | 179—100.2 |
| 2,937,240 | 5/1960 | Harker | 179—100.2 |
| 2,957,051 | 10/1960 | Epstein et al. | 179—100.2 |

FOREIGN PATENTS

| | | |
|---|---|---|
| 880,342 | 10/1961 | Great Britain. |

IRVING L. SRAGOW, *Primary Examiner.*

NEWTON N. LOVEWELL, BERNARD KONICK, *Examiners.*